(12) United States Patent
Xu et al.

(10) Patent No.: US 6,214,173 B1
(45) Date of Patent: Apr. 10, 2001

(54) ON-SITE MANUFACTURE OF ULTRA-HIGH-PURITY NITRIC ACID

(75) Inventors: Mindi Xu, Naperville, IL (US); Wallace I. Yuan, Irvine, CA (US); Tracey Jacksier, Lisle; Hwa-Chi Wang, Naperville, both of IL (US); Joe G. Hoffman, Cardiff; R. Scot Clark, Fallbrook, both of CA (US)

(73) Assignee: Air Liquide Electronics Chemicals & Services, Inc., Houston, TX (US)

( * ) Notice: Subject to any disclaimer, the term of this patent is extended or adjusted under 35 U.S.C. 154(b) by 0 days.

(21) Appl. No.: 08/759,213

(22) Filed: Dec. 5, 1996

Related U.S. Application Data (63) Continuation-in-part of application No. 08/674,016, filed on Jul. 1, 1996, now abandoned, which is a continuation-in-part of application No. PCT/US96/09215, filed on Jun. 5, 1996.

(51) Int. Cl.$^7$ ................................. B01D 3/00; B01D 3/34
(52) U.S. Cl. ................................. 203/75; 203/86; 203/96; 203/99; 202/161; 202/180; 202/185.1; 202/202
(58) Field of Search .................... 203/86, 96, 99, 203/DIG. 19, 74, 75; 202/267.1, 202, 180, 161, 183, 185.1; 159/DIG. 15; 423/484

(56) References Cited

U.S. PATENT DOCUMENTS

| | | | |
|---|---|---|---|
| 3,401,095 | 9/1968 | Saradzhev | 203/13 |
| 4,144,092 | 3/1979 | Krepler | 134/12 |
| 4,756,899 | 7/1988 | Jenczewski et al. | 423/483 |
| 4,828,660 | 5/1989 | Clark et al. | 204/82 |
| 4,892,625 | 1/1990 | Shimizu et al. | 422/86 |
| 4,929,435 | 5/1990 | Boghean et al. | 423/484 |
| 4,952,386 | 8/1990 | Davison et al. | 423/484 |
| 4,980,032 | 12/1990 | Dobson et al. | 423/484 |
| 5,164,049 | 11/1992 | Clark et al. | 203/40 |
| 5,288,333 | 2/1994 | Tanaka et al. | 134/31 |
| 5,346,557 | 9/1994 | Ito et al. | 134/10 |
| 5,362,469 | 11/1994 | Seseke-Koyro et al. | 423/484 |
| 5,496,778 | 3/1996 | Hoffman et al. | 437/250 |
| 5,500,098 | 3/1996 | Brown et al. | 203/13 |

FOREIGN PATENT DOCUMENTS

| | | |
|---|---|---|
| 62-213127 | 9/1987 | (JP). |
| 62-253772 | 11/1987 | (JP). |
| 62-264280 | 11/1987 | (JP). |
| 63-152603 | 6/1988 | (JP). |
| 63-283027 | 11/1988 | (JP). |
| 64-34407 | 2/1989 | (JP). |

OTHER PUBLICATIONS

Supplementary European Search Report issued in PCT Application No. PCT/US96/09215.

Primary Examiner—Nina Bhat
(74) Attorney, Agent, or Firm—Burns, Doane, Swecker & Mathis, L.L.P.

(57) ABSTRACT

Provided is a novel on-site system and method for providing ultra-high-purity nitric acid to a point of use. The system includes a source of nitric acid at a concentration greater than 68 wt %; a reflux distillation column having an inlet in communication with the nitric acid source for introducing nitric acid into the column, a reboiler, and a condensate outlet to provide a flow of nitric acid condensate from the column; a reservoir in communication with the condensate outlet for receiving the flow of nitric acid condensate; and piping for delivering nitric acid from the reservoir to a point of use. The system and method can be used as an on-site subsystem, in a semiconductor device fabrication facility for supplying the nitric acid condensate to points of use in the semiconductor device fabrication facility.

32 Claims, 8 Drawing Sheets

ON-SITE MANUFACTURE OF ULTRA-HIGH-PURITY NITRIC ACID

CROSS REFERENCE TO RELATED APPLICATIONS

This application is a continuation-in-part of application Ser. No. 08/674,016, filed Jul. 1, 1996 now abandoned. This application is also a continuation-in-part of PCT application No. PCT/US96/09215, filed Jun. 5, 1996.

BACKGROUND OF THE INVENTION

1. Field of the Invention

The present invention relates to an on-site system and a method for providing ultra-high-purity nitric acid to a point of use. The present invention also relates to an on-site subsystem and a method, in a semiconductor device fabrication facility, for providing ultra-high-purity nitric acid to a semiconductor manufacturing operation.

2. Description of the Related Art a. Contamination Control

Contamination is generally an overwhelmingly important concern in integrated circuit (IC) manufacturing. A large fraction of the steps used in modern integrated circuit manufacturing are cleanup steps of one kind or another. Such cleanup steps are used, for example, to remove organic contaminants, metallic contaminants, photoresist (or inorganic residues thereof), byproducts of etching, native oxides, etc.

As of 1995, the cost of a new front end (IC wafer fabrication facility) was typically more than one billion dollars ($1,000,000,000). A large fraction of the cost for such facilities is directed to measures for particulate control, cleanup, and contamination control.

One important and basic source of contamination in semiconductor fabrication is impurities in the process chemicals. Since the cleanup steps are performed so frequently in and are so critical to IC fabrication, contamination due to cleanup chemistry is very undesirable.

b. Wet Versus Dry Processing

One of the long-running technological shifts in semiconductor processing has been the changes (and attempted changes) between dry and wet processing. In dry processing, only gaseous or plasma-phase reactants come in contact with the wafer or wafers being treated. In wet processing, a variety of liquid reagents are used for a multitude of purposes, such as the etching of silicon dioxide, silicon nitride and silicon, and the removal of native oxide layers, organic materials, trace organic or inorganic contaminants and metals.

While plasma etching has many attractive capabilities, it is not adequate for use in cleanup processes. There is simply no available chemistry with plasma etching to remove some of the most undesirable impurities, such as gold. Thus, wet cleanup processes are essential to modern semiconductor processing, and are likely to remain so for the foreseeable future.

Plasma etching is performed using a photoresist mask in place, and is not immediately followed by high-temperature processes. After plasma etching, the resist is stripped from the wafer surface using, for example, an $O_2$ plasma treatment. Cleanup of the resist stripped wafer(s) is then necessary.

The materials which the cleanup process should remove include, for example, photoresist residues (organic polymers), sodium, alkaline earth metals (e.g., calcium, magnesium) and heavy metals (e.g., gold). Many of these contaminants do not form volatile halides. As a result, plasma etching will not remove such contaminants from the wafer surface. Hence, cleanup processes using wet chemistries are required.

Because any dangerous contaminants stemming from the plasma etching process are removed prior to high-temperature processing steps by wet chemical treatment, the purities of plasma etching process chemicals (i.e., liquified or compressed gases) are not as critical as those of the liquid chemicals used in cleanup processes. This difference is due to the impingement rate of the liquid chemical at the semiconductor surface typically being one million times greater than that of the plasma species in plasma etching. Moreover, since the liquid cleanup steps are directly followed by high-temperature processes, contaminants on the wafer surface tend to be driven (i.e., diffused) into the wafer.

Wet processing has a major drawback insofar as ionic contamination is concerned. Integrated circuit devices generally use only a few dopant species (e.g., boron, arsenic, phosphorus, and antimony) to form the requisite p-type and n-type doped regions of the device. However, many other species act as electrically active dopants, and are highly undesirable contaminants. These contaminants can have deleterious effects on the IC devices, such as increased junction leakage at concentrations well below $10^{13}$ cm$^{-3}$.

Moreover, some less desirable contaminants segregate into the silicon substrate. This occurs when silicon is in contact with an aqueous solution, and the equilibrium concentration of the contaminants is higher in the silicon than in the solution. Moreover, some less desirable contaminants have very high diffusion coefficients. Consequently, introduction of such contaminants into any part of the silicon wafer may result in diffusion of the contaminants throughout the wafer, including junction locations where leakage may result.

Thus, liquid solutions for treating semiconductor wafers should have extremely low levels of metal ions. Preferably, the concentration of all metals combined should be less than 300 ppt (parts per trillion), and less than 10 ppt for any single metal. Even lower concentrations are desirable. Contamination by anions and cations should also be controlled. Some anions may have adverse effects, such as complexed metal ions which reduce to mobile metal atoms or ions in the silicon lattice.

Front end facilities typically include on-site purification systems for preparation of high-purity water (i.e., "deionized" or "DI" water). However, it is more difficult to obtain liquid process chemicals in the purities required.

c. Purity in Semiconductor Manufacturing

Undetected contamination of chemicals increases the probability for costly damage to a large quantity of wafers. The extreme purity levels required by semiconductor manufacturing are rare and unique among industrial processes. With such extreme purity requirements, handling of chemicals is undesirable (though of course it cannot be entirely avoided). Exposure of ultrapure chemicals to air (particularly in an environment where workers are also present) should be minimized. Such exposure risks the introduction of particulates into the chemicals, which can result in the contamination of those chemicals. Furthermore, shipment of ultrapure chemicals in closed containers is not ideal, since such containers increase the risk of contaminants being generated at the manufacturer's or at the user's site.

Since many corrosive and/or toxic chemicals are used in semiconductor processing, the reagent supply locations are commonly separated from the locations where front-end workers are present. Construction and maintenance of piping for ultra-high-purity (UHP) gases and liquids are well-understood in the semiconductor industry, and most gases and liquids can be transported to wafer fabrication stations from anywhere in the same building (or in the same site).

d. Uses of Nitric Acid in Semiconductor Processing

One of the important chemicals in semiconductor processing is nitric acid ($HNO_3$). Nitric acid is useful in the wet etching of silicon. It is also used, for example, in chemical-mechanical polishing of interconnect metallization, in compounds for etching various heavy metals, and in defect etching.

e. Objects and Advantages of the Invention

To meet the requirements of the semiconductor processing industry and to overcome the disadvantages of the related art, it is an object of the present invention to provide a novel system for the on-site preparation of ultra-high-purity nitric acid, in which the nitric acid can be piped directly to a point of use. The system is very compact, and can be located in the same building as the point of use (or in an adjacent building), so that chemical handling can be avoided. As a result, low impurity levels on a semiconductor wafer surface can be achieved, resulting in better device characteristics and increased product yield.

SUMMARY OF THE INVENTION

The foregoing objectives are met by the systems and methods of the present invention. According to a first aspect of the present invention, a novel on-site system for providing ultra-high-purity nitric acid to a point of use is provided. The system includes: (a) a source of nitric acid at a concentration greater than 68 wt %; (b) a reflux distillation column having an inlet in communication with the nitric acid source for introducing nitric acid into the column, a reboiler, and a condensate outlet to provide a flow of nitric acid condensate from the column; (c) a reservoir in communication with the condensate outlet for receiving the flow of nitric acid condensate; and (d) piping for delivering nitric acid from the reservoir to a point of use.

According to a second aspect of the invention, the inventive system is used as an on-site subsystem, in a semiconductor device fabrication facility for supplying the nitric acid condensate to points of use in the semiconductor device fabrication facility.

According to a third aspect of the invention, a method for providing on-site an ultra-high-purity nitric acid to a point of use is provided. The method involves the steps of: (a) providing a source of nitric acid at a concentration greater than 68 wt %; (b) introducing the nitric acid into a reflux distillation column, and withdrawing a nitric acid condensate flow from the column; (c) providing a reservoir for receiving the flow of nitric acid condensate; and (d) delivering the nitric acid from the reservoir to a point of use.

According to a fourth aspect of the invention, the inventive method provides on-site, in a semiconductor device fabrication facility, an ultra-high-purity nitric acid to a semiconductor manufacturing operation.

BRIEF DESCRIPTION OF THE DRAWINGS

The objects and advantages of the invention will become apparent from the following detailed description of the preferred embodiments thereof in connection with the accompanying drawings, in which like reference numerals designate like elements, and in which.

DETAILED DESCRIPTION OF THE PREFERRED EMBODIMENTS OF THE INVENTION

The inventors have surprisingly and unexpectedly discovered that on-site distillation of nitric acid according to the present invention can be used to obtain ultra-high-purity (UHP) nitric acid, which has particular applicability in the semiconductor manufacturing industry.

A first embodiment of the invention will now be described with reference to FIG. 1, which illustrates an on-site distillation system used for nitric acid ultrapurification which can be used in a semiconductor manufacturing facility. According to this first embodiment, supply tank T-3 supplies nitric acid feedstock to the reboiler portion R-1 of column C-1. The nitric acid feedstock can be, for example, technical-grade nitric acid.

Figure 2:
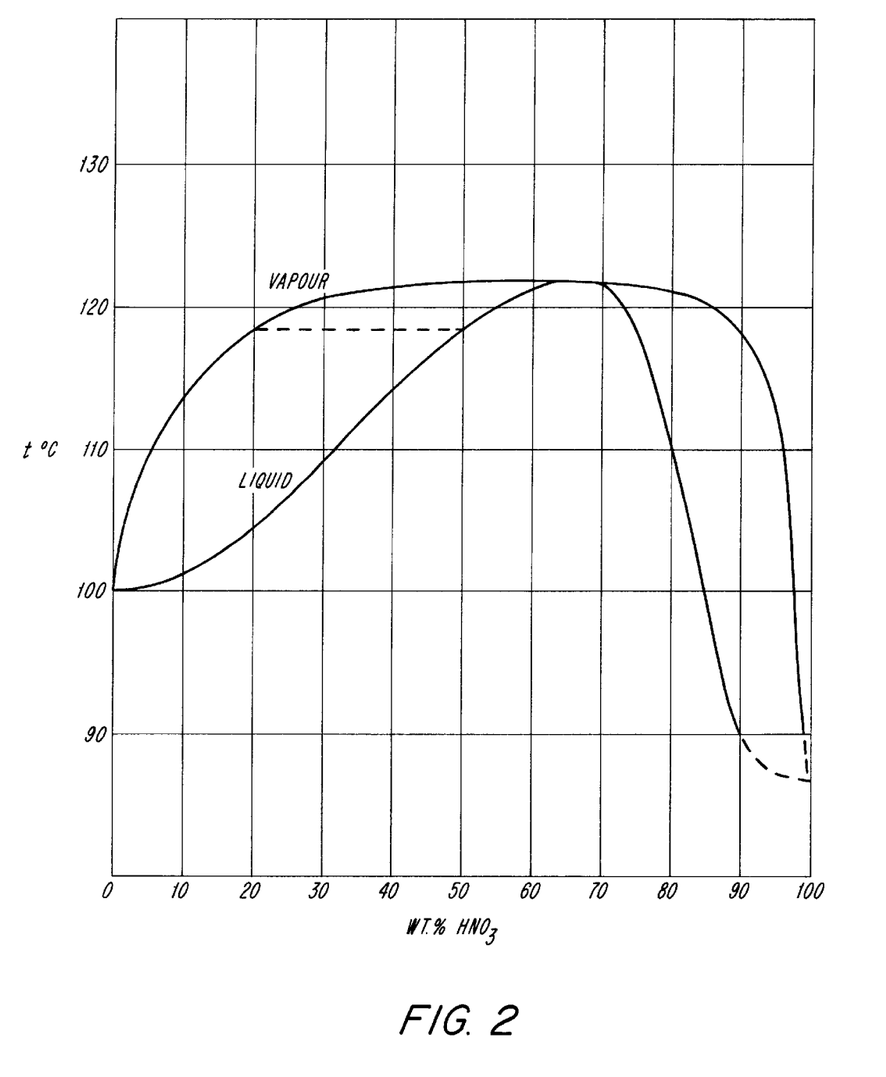
FIG. 2 shows a phase diagram for the $H_2O/HNO_3$ system.

As shown in FIG. 2, the $HNO_3/H_2O$ system has a high-boiling point azeotrope at about 68.5 wt % $HNO_3$ (b.p. 122° C.). In accordance with a preferred embodiment of the invention, the source material for distillation is provided at a concentration higher than that of the high-boiling point azeotrope to prevent dilution during condensation of the $HNO_3$ vapor. The nitric acid should be fed to reboiler R-1 at a concentration greater than 68 wt %, preferably greater than 70 wt %, and more preferably at a concentration of 72 wt %.

As used herein, the term "nitric acid source" means the nitric acid in the stream feeding the reboiler in the distillation column. In the event more than one nitric acid stream feeds into the reboiler, the nitric acid concentration is based on the total nitric acid feeding the reboiler. Thus, if T-1 contains <68% $HNO_3$ but T-2 contains >68 wt % $HNO_3$, as long as the weight percentage of the feed to the reboiler is greater than 68 wt %, the "source material" is considered to be greater than 68 wt %.

Figure 1:
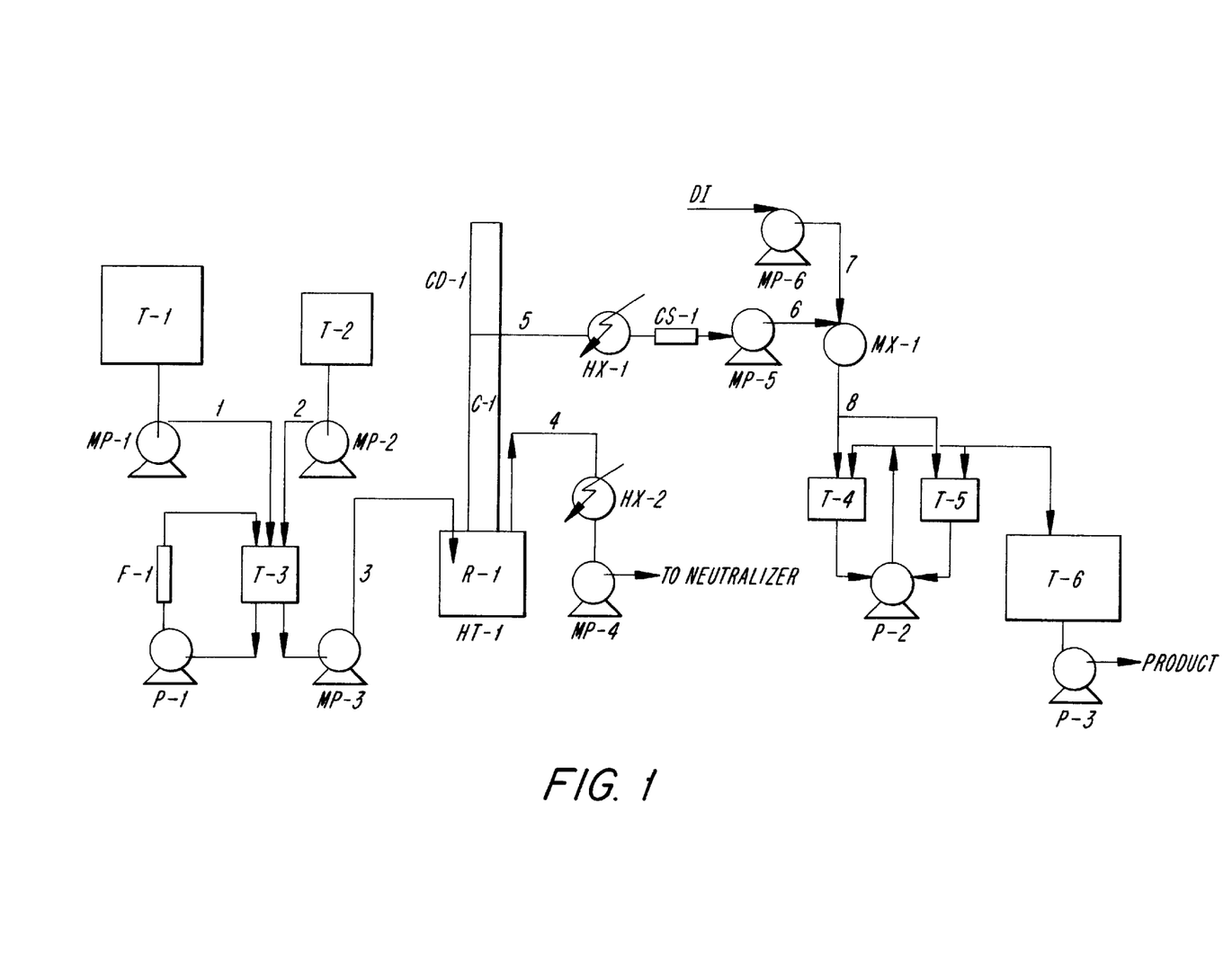
FIG. 1 is a schematic diagram of the nitric acid purification system/process flow according to a first embodiment of the invention.

As shown in FIG. 1, supply tank T-3 can optionally be fed from tanks T-1 and/or T-2, to permit mixing of the nitric acid to the requisite concentration. Top condenser CD-1 removes heat of condensation from the vapor, and condensate (product) is removed in line 5. A reflux condenser is preferably used, and a continuous purge via line 4 advantageously prevents impurities from accumulating. The purge should be at least 5% and the condensate evaporated to prevent impurities from accumulating. The purged material passes through heat exchanger HX-2, and is then pumped to a neutralizer by pump MP-4.

The condensate is further cooled by heat exchanger (aftercooler) HX-1. A small top stream from condenser CD-1 is vented. This vented stream is about 0.1% of the total vapor-phase flow.

The condensate (product) is diluted to the strength desired in tanks T-4 and T-5, which can be used alternately. The diluted product is fed to reservoir T-6 for metering, as desired, to the point of use.

In diluting the acid, ultrapure water (DI) is mixed with the condensate stream via line 7. Typical standards for ultrapure water include, for example, a resistivity of at least about 15 megohm-cm at 25° C., preferably 18 megohm-cm at 25° C., less than about 25 ppb of electrolytes, a particulate content of less than about $150/cm^3$, a particle size of less than 0.2 $\mu$m, a microorganism content of less than about $10/cm^3$ and total organic carbon of less than 100 ppb.

Column HT-1 typically contains a conventional column packing to provide for a high degree of contact between liquid and vapor phases. The packing material is preferably 8×8 mm, but can alternatively be, for example, 6×6 mm or 10×10 mm. Suitable packing materials are known in the art, and include, for example, Raschig rings, Lessing Rings, Berl saddles, spiral partition rings and grid packing, with Raschig rings being preferred. Suitable materials of construction of the packing material includes, for example, glass, quartz, ceramics and stainless steel.

According to one preferred example, column HT-1 has a packed height of approximately 3 feet (0.9 meter) and an internal diameter of approximately 7 inches (18 cm), to achieve a packing volume of 0.84 cubic feet (24 liters), and is operated at a pressure drop of about 0.3 inches of water (0.075 kPa) or less, and less than 10% reflux.

Reboiler R-1 can be a container with an opening to allow a vapor stream of nitric acid to flow upwards into the packed column, and to allow condensate from the column to flow downward to the reboiler. Another opening is present to allow raw nitric acid to be fed into reboiler R-1. Another opening is present which allows a small percentage of purge flow to be withdrawn from the reboiler via line 4. Suitable materials of construction for the reboiler are the stainless steels, with 304L stainless steel being preferred.

The ultrapure chemical thus generated is routed directly (preferably through ultraclean piping), to the point of use in a semiconductor front end. Piping for ultrapure chemical routing in semiconductor front ends may include in-line or pressure reservoirs. Thus, the terms "direct piping," "direct routing," etc., do not preclude use of such reservoirs. However, such terms do preclude exposure to uncontrolled atmospheres.

Figure 3:
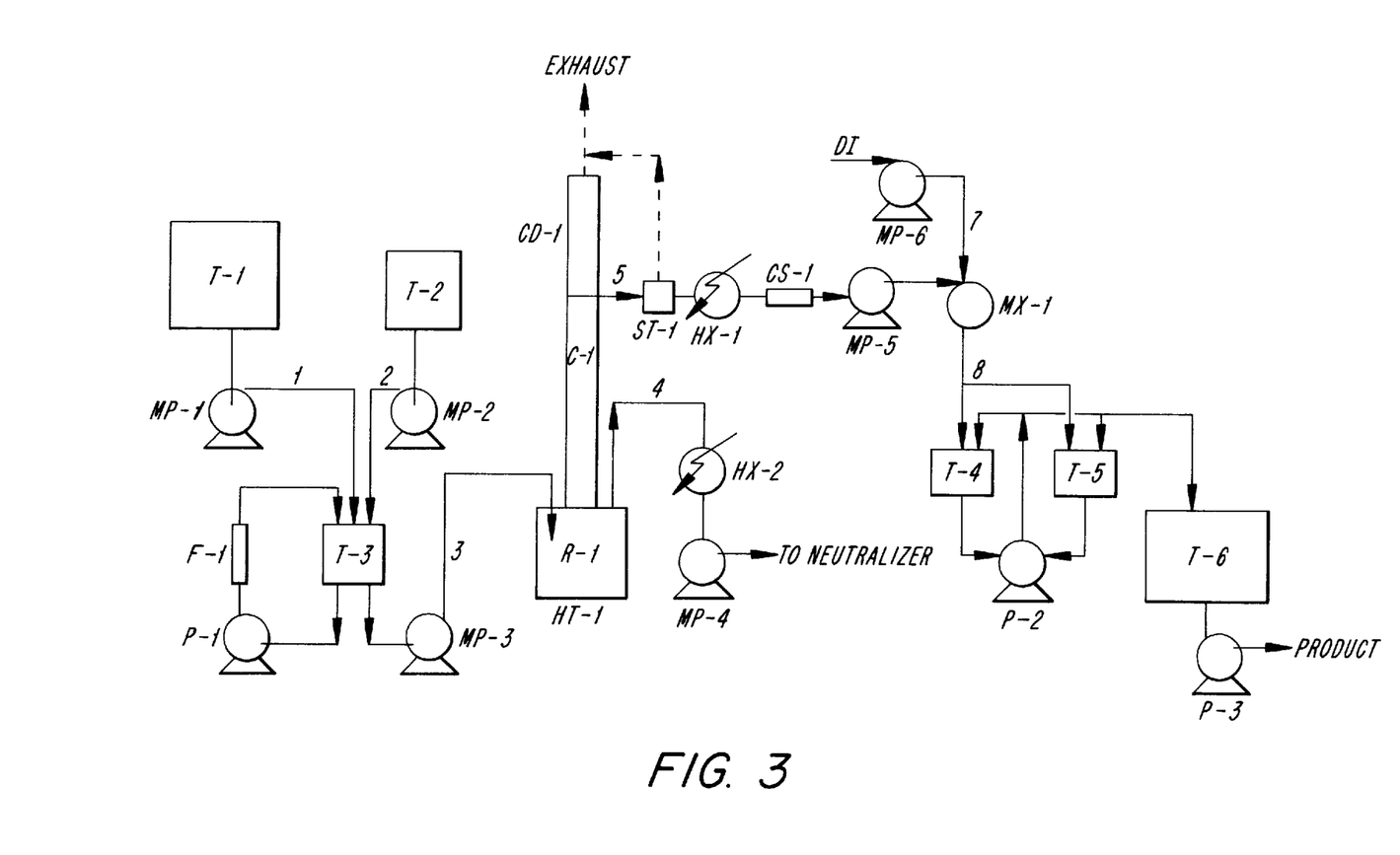
FIG. 3 is a schematic diagram of the nitric acid purification system/process flow according to a second embodiment of the invention.

Table 1 below provides sample flows, scaled to production of one ton $HNO_3$ per day, for the system illustrated in FIG. 1:

FIG. 3 illustrates an on-site distillation system used for nitric acid ultrapurification at a semiconductor manufacturing facility according to a second embodiment of the invention. This distillation system differs from that illustrated in FIG. 1 in the provision of a condensate stripper ST-1. This condensate stripper is used to remove low boiling point impurities condensed in top condenser CD-1. The remaining parts of the system and the operational parameters are similar to those described above with reference to FIG. 1.

In accordance with this second embodiment, the condensate (product) in line 5 is first passed through condensate stripper ST-1. The low boiling compounds (if any) are vented through a pipe to the main vent at top condenser CD-1. A small amount of nitric acid will evaporate during this process and is vented as described above. This evaporation is dependent upon temperature and evaporation surface area, as well as residence time of the condensate in condensate stripper ST-1.

Condensate stripper ST-1 should not be heated since the condensate temperature is still high at that point (e.g., greater than 70° C.). However, a lower condensate temperature in condensate stripper ST-1 can be achieved by use of a heat exchanger in stream 5 prior to condensate stripper ST-1. The condensate from condensate stripper ST-1 is then passed through heat exchanger HX-1 for further cooling.

Figure 4:
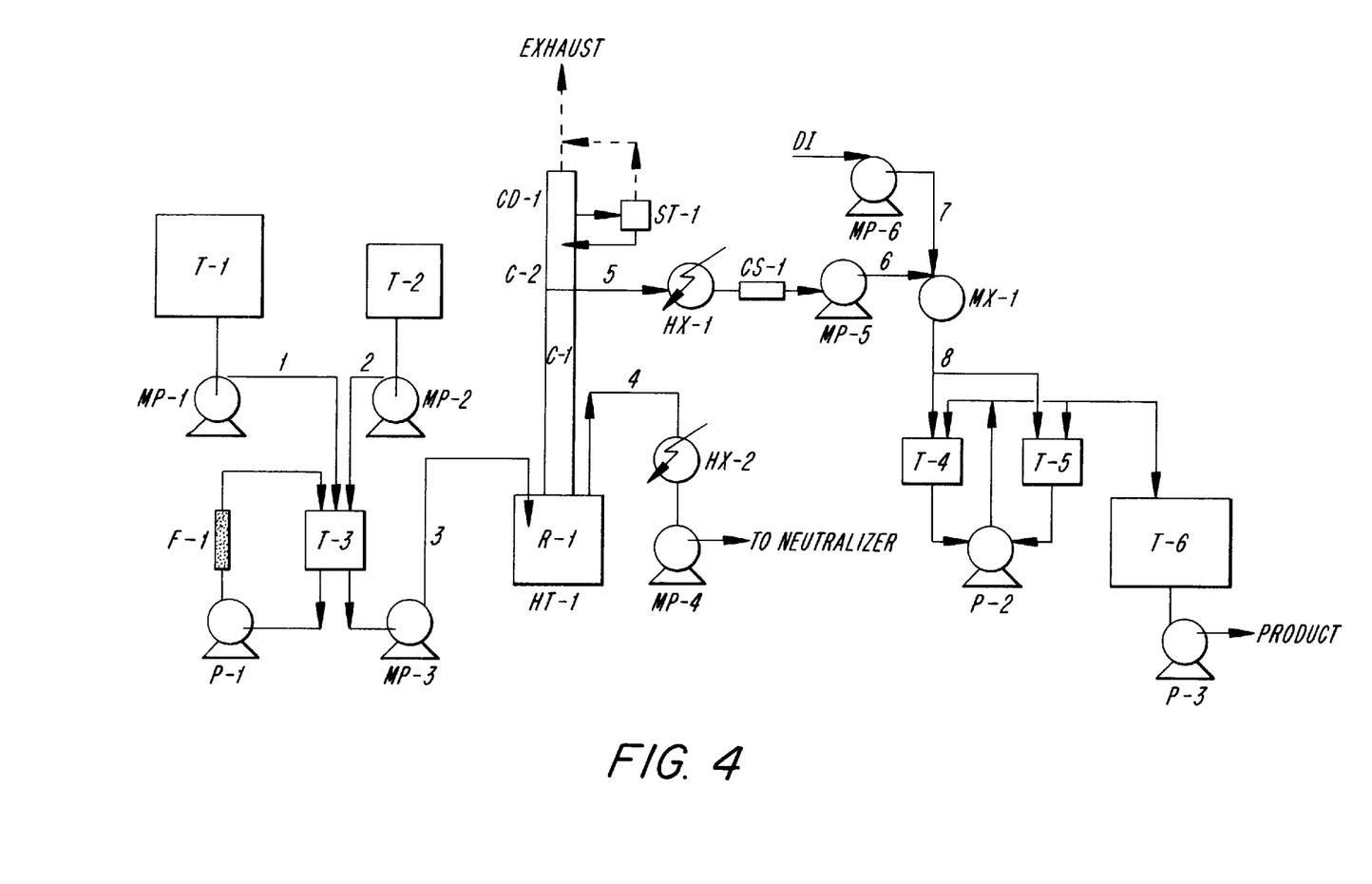
FIG. 4 is a schematic diagram of the nitric acid purification system/process flow according to a third embodiment of the invention.

FIG. 4 shows a third embodiment of the distillation system used for nitric acid ultrapurification. The difference between this system and that illustrated in FIG. 1 lies in the concurrent use of a second packed column C-2 and a condensate stripper ST-1. The other parts and operation parameters are similar to those described above with reference to FIG. 1.

The condensate from top condenser CD-1 at least partially flows to condensate stripper ST-1, with any other condensate from the top condenser flowing down to packed column C-2. The low boiling volatiles (if any) from stripper ST-1 are vented to the main vent at the top condenser, as in the system described above with reference to FIG. 3. Condensate stripper ST-1 is preferably not heated since the condensate temperature is still high. The condensate from stripper ST-1 joins the reflux flow at the top of packed column C-2. Condensate product is removed from the top of packed column C-1 through line 5, and flows through heat exchanger HX-1 for further cooling.

As with column C-1, column C-2 can contain a conventional column packing which provides for a high degree of contact between the liquid and vapor phases. In one preferred example, column C-2 can have a packed height, for example, of 1 foot (0.3 m) and an internal diameter of approximately 7 inches (18 cm), and is operated at a pressure drop of less than 0.15 inches water (0.038 kPa) and 100% reflux. The packed material is preferably 8×8 mm, but

TABLE 1

| Stream No. | 1 | 2 | 3 | 4 | 5 | 6 | 7 | 8 |
|---|---|---|---|---|---|---|---|---|
| Mass (T/D) | 1.0000 | 0.1000 | 1.1000 | 0.1241 | 0.9759 | 0.9759 | 0.0241 | 1.0000 |
| $HNO_3$ (T/D) | 0.6900 | 0.0950 | 0.7850 | 0.0850 | 0.7000 | 0.7000 | 0.0000 | 0.7000 |
| $H_2O$ (T/D) | 0.3100 | 0.0050 | 0.3150 | 0.0391 | 0.2759 | 0.2759 | 0.0241 | 0.3000 |
| wt % $HNO_3$ | 69.00 | 95.00 | 71.36 | 68.50 | 71.73 | 71.73 | 0.00 | 70.00 |
| Sp. Grav. | 1.4091 | 1.4932 | 1.4190 | 1.2920 | 1.2760 | 1.4053 | 1.0000 | 1.3971 |
| Rate (gpm) | 0.1302 | 0.0123 | 0.1422 | 0.0176 | 0.1403 | 0.1274 | 0.0044 | 0.1313 |
| Rate (ml/m) | 492.83 | 46.51 | 538.33 | 66.70 | 531.13 | 482.26 | 16.73 | 497.06 |
| Temp (° C.) | 20 | 20 | 29.50 | 122 | 120 | 30 | 20 | 31.88 |
| Sp. Heat | 0.617 | 0.485 | 0.605 | 0.620 | 0.608 | 0.608 | 1.000 | 0.615 | can also be, for example, 6×6 mm or 10×10 mm, and having the same or different shape and material as those of the packing for column C-1. This packed material can also be used in column C-1, which is operated at a reflux rate of preferably less than 50%.

Each of the units described above can be operated in a batchwise, a continuous, or a semi-continuous manner, with a continuous or a semi-continuous operation being preferred.

EXAMPLE 1

A bench-scale experiment for nitric acid distillation was carried out successfully using a 1 inch diameter (2.5 cm) distillation column. This apparatus and experiment were designed to demonstrate the practicality of the full-scale apparatus of FIG. 1. The system used for this experiment is illustrated in FIG. 5.

Figure 5:
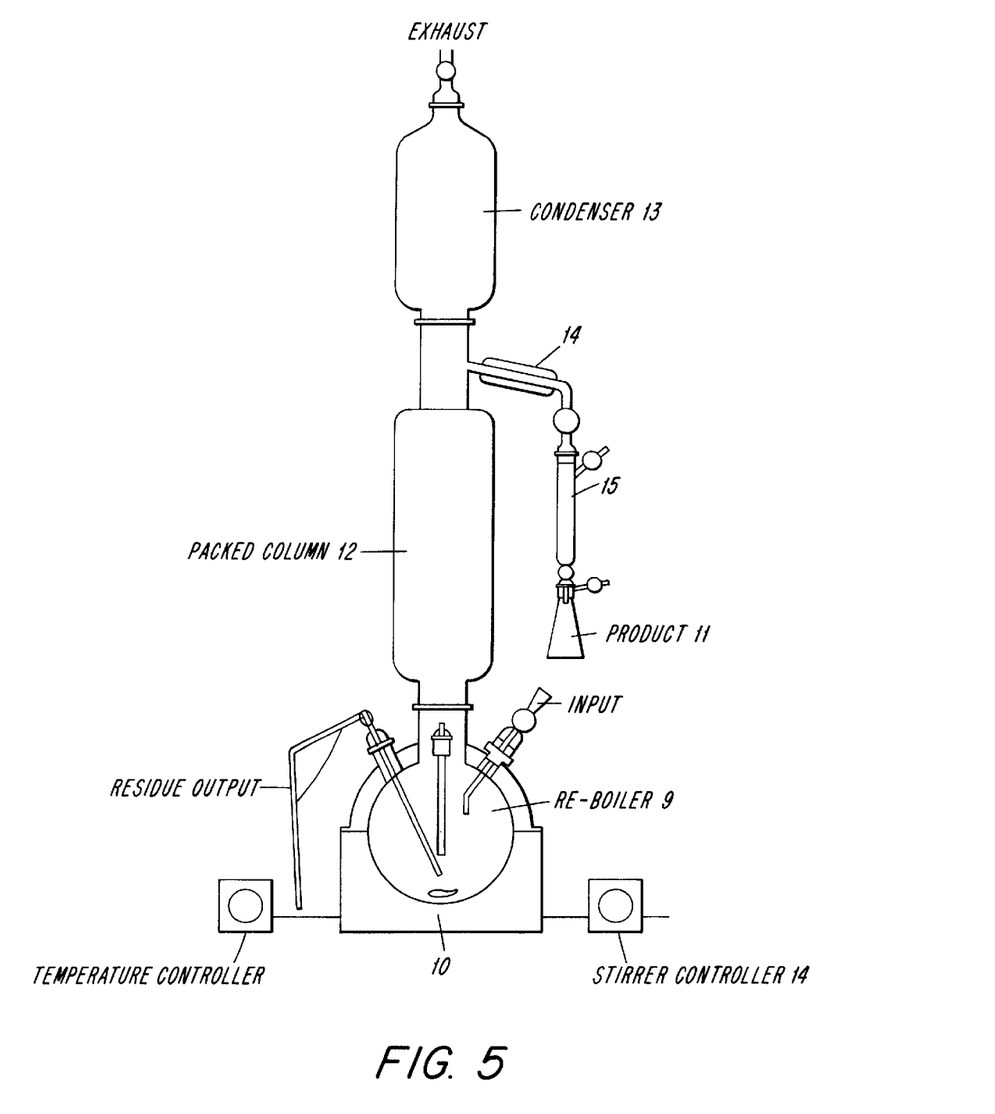
FIG. 5 illustrates a first benchtop apparatus used to derive actual test results.

Referring to FIG. 5, reboiler flask 9 was heated by a 600 W heating mantle 10. With this heating mantle, the boil up rate was 17.4 g/min. Product 11 was drawn between packed column 12 and condenser 13, and cooled by cooling stages 14 and 15. This apparatus was operated in batch mode.

The feedstock used was 72 wt % technical grade nitric acid from Fisher. The illustrated full scale configuration of FIG. 1 can be used to provide an admixture of fuming nitric acid, to bring the concentration up high enough, but the presently preferred embodiment simply uses a more concentrated feedstock.

To startup the system properly, two runs were performed: (1) A "cleanup" run was first performed using reagent grade acid to reduce contaminant levels in the system, and then (2) batch distillation was performed using technical grade acid.

The results from the tests run with the bench-scale apparatus of FIG. 5 are summarized in Table 2, below, which provides measured concentrations in parts per billion (ppb) for the impurities listed. Most of the impurities measured were below the detection limit in the condensate.

In the "cleanup" run, two separate distillations were run (i.e., "1st Dist" and "2nd Dist"). The two columns used for each run provide data measured on subsequent days based on the same sample. The data indicates that the apparatus was substantially clean prior to batch distillation of the technical grade acid.

With respect to the batch distillation data, the "Tech Gr" data was based on the acid fed into the system. Once distillation was started, first, second and third cut samples were taken with intervals of 30 min. and 15 min. between first and second cuts and second and third cuts, respectively. The "Pot Liq" sample is based on the undistilled material.

The data indicates that highly pure $HNO_3$ is obtainable through the inventive method and apparatus.

Decomposition of Nitric Acid during Distillation

Nitric acid was found to decompose during distillation, producing a noticeable amount of red brown $NO_x$ vapor (mostly $NO_2$). Since the density of $NO_x$ vapor is heavier than air but lighter than the water-nitric acid vapor, this red brown cloud tended to stay at the bottom of the condenser during the distillation experiment, and fell down into the reboiler flask after the heater was turned off.

The amount of this decomposition depends on the assay and the amount of the boiling acid, as well as the time of distillation. A 71.4% acid was found to decompose much more readily than a 69.4 to 70.0% acid.

Measurements of the acid balance showed that the amount of acid loss was within experimental uncertainty for all four experiments. Even for the first experiment, with the most obvious decomposition qualitatively, the apparatus was dry at the start and most of the 2% acid loss remained in the wetted packed column. Consequently, only a small portion of the acid loss was due to decomposition.

Even though the decomposition rate is very low, the decomposed products may accumulate; thus, in a continuous process, the red-brown cloud of $NO_x$ vapor will eventually fill the condenser and continuously vent to the scrubber.

EXAMPLE 2

Additional bench-scale experiments on nitric acid distillation were carried out successfully using the same system used in Example 1, and which is shown in FIG. 5. These

TABLE 2

| | Cleanup with Reagent Grade Acid | | | | Batch Distillation of Technical Grade Acid | | | | |
| --- | --- | --- | --- | --- | --- | --- | --- | --- | --- |
| | 1st Dist. | 1st Dist. | 2nd Dist. | 2nd Dist. | Tech Gr | 1st Cut | 2nd Cut | 3rd Cut | Pot Liq |
| Date | 4/9/96 | 4/10/96 | 4/9/96 | 4/10/96 | 4/10/96 | 4/9/96 | 4/9/96 | 4/9/96 | 4/9/96 |
| Sample | 1715 | 1715 | 1725 | 1725 | 50-13 | 1130 | 1200 | 1215 | 1400 |
| Element | (ppb) | (ppb) | (ppb) | (ppb) | (ppb) | (ppb) | (ppb) | (ppb) | (ppb) |
| Na | 22.46 | 18.24 | 83.1 | 79.2 | 137.97 | <1 | <1 | 4.11 | 122.7 |
| Mg | <1 | <1 | 4.81 | 4.66 | <1 | <1 | <1 | <1 | 37.03 |
| Al | <1 | <1 | <1 | <1 | <1 | <1 | <1 | <1 | 4.02 |
| P | 355.9 | <50 | 140.6 | <50 | <50 | <50 | <50 | <50 | <50 |
| K | <1 | <1 | <1 | <1 | <1 | <1 | <1 | <1 | <1 |
| Ca | <1 | <1 | <1 | <1 | <1 | <1 | <1 | <1 | <1 |
| V | <1 | <1 | <1 | <1 | <1 | <1 | <1 | <1 | <1 |
| Cr | 57.53 | 51.18 | <2 | <2 | <2 | <2 | <2 | <2 | 26.71 |
| Mn | 51.24 | 51.94 | <1 | <1 | <1 | <1 | <1 | <1 | <1 |
| Fe | 1152 | 1134 | 25.8 | 19.4 | <2 | <2 | <2 | <2 | <2 |
| Ni | 313.2 | 319.4 | <2 | <2 | <2 | <2 | <2 | <2 | 15.57 |
| Co | 3.48 | <1 | <1 | <1 | <1 | <1 | <1 | <1 | <1 |
| Cu | 5.05 | <1 | <1 | <1 | <1 | <1 | <1 | <1 | 1.48 |
| Zn | 83.41 | 82.35 | <1 | <1 | <1 | <1 | 1.07 | <1 | 20.53 |
| Me | <0.5 | 2.79 | <0.5 | <0.5 | <0.5 | <0.5 | <0.5 | <0.5 | <0.5 |
| Cd | <2 | <2 | <2 | <2 | <2 | <2 | <2 | <2 | <2 |
| Ba | <2 | <2 | <2 | <2 | <2 | <2 | <2 | <2 | <2 |
| Pb | <5 | <5 | <5 | <5 | <5 | <5 | <5 | <5 | <5 | additional experiments were designed to further demonstrate the practicality of the full-scale apparatus.

In these experiments, the operational parameters and procedures were the same as in the experiments of Example 1. However, in this case, a portion of the reboiler interior surface in contact with the nitric acid was covered with a 304L stainless steel coupon.

The results from these experiments are shown below in Table 3, which shows measured concentrations for various impurities.

TABLE 3

Metal Concentration in Distillate (ppb)

| Element | Reflux Ratio = 1.4* | Reflux Ratio = 0.38* | Metal Concentration in Re-Boiler (ppb) |
|---|---|---|---|
| Na | 1.76 | 13.59 | 616.2 |
| Mg | <1 | <1 | 136.1 |
| Al | <1 | <1 | 130.2 |
| P | <50 | <50 | 255.2 |
| K | <1 | <1 | 425.9 |
| Ca | <1 | <1 | 10.96 |
| V | <1 | <1 | 63.2 |
| Cr | <2 | <2 | 37.79 |
| Mn | <1 | <1 | 1448 |
| Fe | <2 | <2 | 62514 |
| Ni | <2 | <2 | 5944 |
| Co | <1 | <1 | 22.63 |
| Cu | <1 | <1 | 511.62 |
| Zn | <1 | <1 | 359.44 |
| Mo | <0.5 | <0.5 | 27.98 |
| Cd | <2 | <2 | <2 |
| Ba | <2 | <2 | <2 |
| Pb | <5 | <5 | <5 |

*Reflux Ratio = Reflux Rate/Product Rate

As shown in Table 3, the majority of the impurity concentrations in the condensate were less than the detection limit.

EXAMPLE 3

Figure 6:
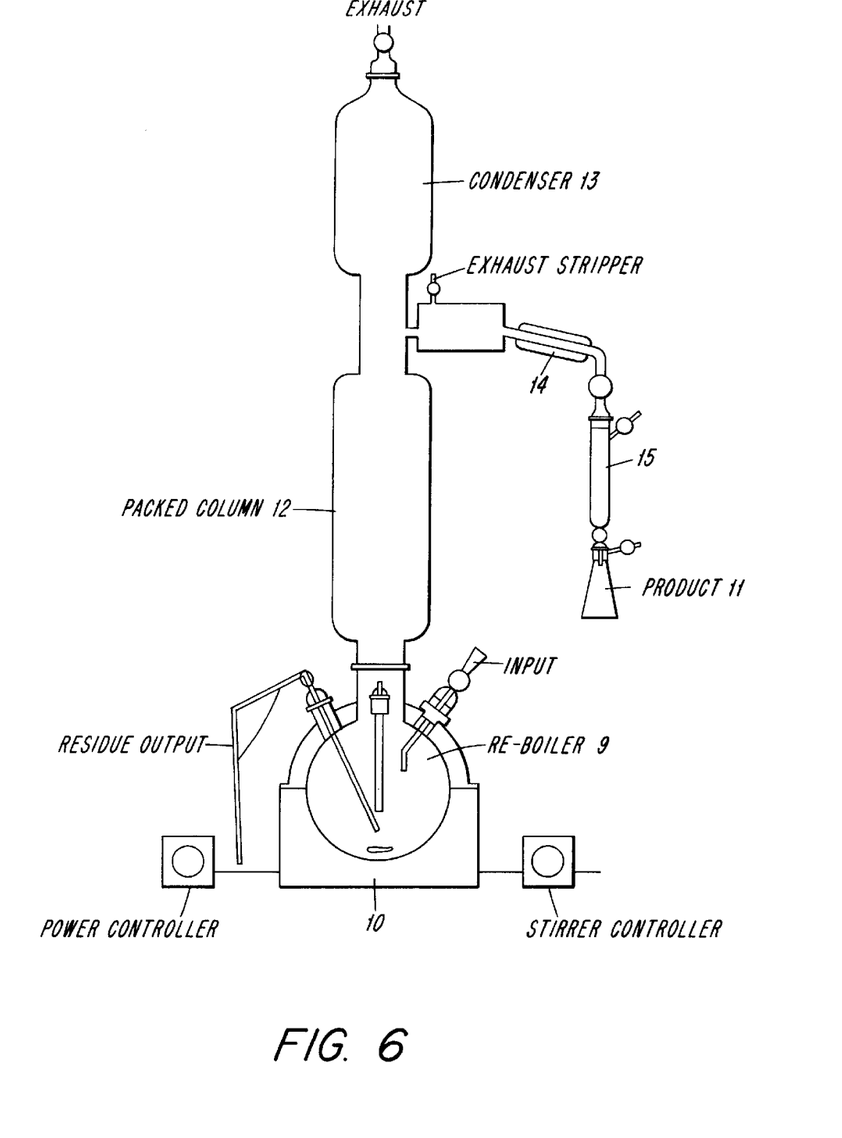
FIG. 6 illustrates a second benchtop apparatus used to derive actual test results.

The bench-scale distillation systems shown in FIG. 6 was used to carry out additional experiments to further demonstrate the practicality of the full-scale ultrapurification systems of FIGS. 1, 3 and 4.

Table 4 below shows the results from actual tests with the system in FIG. 6 for concentrations of phosphorus in parts per billion.

TABLE 4

| Time (min) | P Concentration (ppb) |
|---|---|
| 0 | 266 |
| 90 | 230 |
| 110 | 75 |

As made clear by Table 4, the phosphorus concentration in the condensate after stripping was lower than the concentration without stripping (0 min). A relatively high concentration of phosphorus was sometimes found in the bench-scale experiments. This suggests that there was some chemical activity with phosphorus occurring in the high temperature nitric acid, and a more volatile compound of phosphorus was evolved. Other low boiling point compounds in the condensate, such as the compounds of boron, silicon, chromium and the like were partially or completely stripped and released from the stripper.

Figure 7:
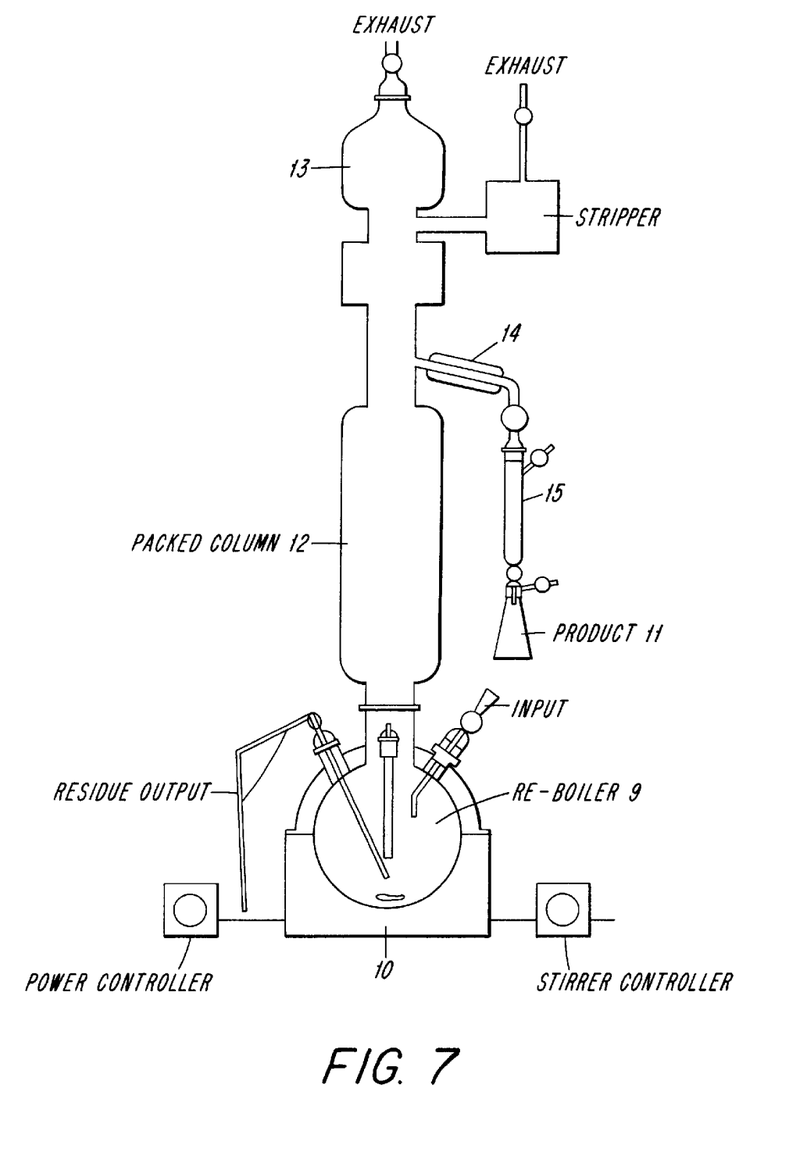
FIG. 7 illustrates a third benchtop apparatus.

FIG. 7 shows a further bench-scale distillation system, configured in a manner similar to the full-scale system of FIG. 4.

Nitric Acid Loss during Distillation

Loss of nitric acid during distillation occurs in three ways: (1) decomposition of nitric acid vapor; (2) incomplete condensation of nitric acid vapor in the condenser; and (3) evaporation of nitric acid in the stripper when the systems in FIG. 2 or FIG. 3 are used.

With respect to Example 1, the decomposition of nitric acid and incomplete condensation of nitric acid vapor were treated together as being a decomposition loss. This loss is dependent on the assay and the amount of the boiling acid as well as the time of distillation. Based on the bench-scale experiments, the loss of the incomplete condensation and decomposition of nitric acid during distillation is only a very small portion of the total acid in the system. Considering total loss as the worst case and including the acid remaining in the packed column, the loss was less than 2%.

The evaporation loss depends on the size of the stripper and the condensate temperature, as well as the residence time of acid in the stripper. Measurement of acid balance showed that the amount of evaporation loss at 70° C. was less than 1% when the residence time was 10 minutes and evaporation area was 50 $cm^2$. The non-condensed vapor and the decomposed products of nitric acid with the evaporated acid together are continuously vented to the scrubber.

IC Fabrication Using the UHP HNO3

Figure 8:
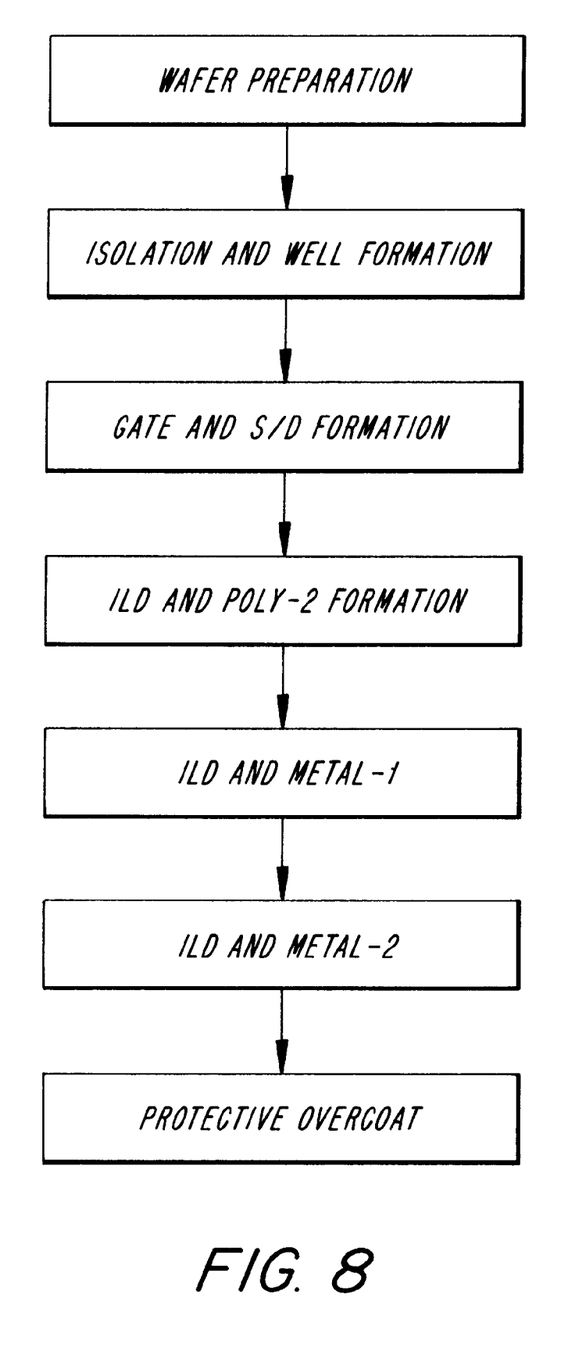
FIG. 8 is a block diagram of a semiconductor fabrication process which is adapted to use the nitric acid produced by the inventive purification systems and methods.

FIG. 8 is a block diagram of a semiconductor fabrication process flow to which the inventive nitric acid purification systems and methods can be readily adapted.

In a typical semiconductor process flow, incoming wafers are thoroughly cleaned and tested during "wafer preparation." Nitric acid can be used at this step for the removal of metallic surface contaminants.

In the processes described as "isolation and well formation," the n-wells and/or p-wells are formed (for CMOS processes), together with field isolation regions (formed, e.g., by LOCOS process or a variant thereof).

Next, a VT (threshold voltage) implant is performed, a sacrificial oxide is grown and stripped, a gate oxide is grown, an insulated gate is formed (e.g., of a silicided polysilicon on the gate oxide) and patterned, and source/drain regions are formed (typically in multiple steps, to provide LDD or graded-drain structures). A first interlevel dielectric ("ILD") is next formed, and a second polysilicon (or polycide) layer is deposited and patterned.

A second ILD is then formed and patterned, and a first metallization layer ("Metal-1") is formed and patterned.

A third ILD is next formed and patterned, and a second metallization layer ("Metal-2") is formed and patterned. Chemical mechanical polishing (CMP) may be used to planarize the upper ILD layers above or beneath the metal layers. Finally, a protective overcoat is deposited, and patterned to expose contact pad locations.

Nitric acid cleaning steps are used before or after most of the above-described processes. By use of the inventive systems and methods to form ultra-high purity nitric acid on-site, the deleterious effects of contamination of the wafer surface can be largely overcome.

While the invention has been described in detail with reference to specific embodiments thereof, it will be apparent to those skilled in the art that various changes and modifications can be made, and equivalents employed, without departing from the scope of the appended claims. For example, the disclosed innovative techniques can be applied to the manufacture of products other than ICs, such as discrete semiconductor components (e.g., optoelectronic and power devices), and to other manufacturing technologies in which IC manufacturing methods have been adopted (e.g., the manufacture of thin-film magnetic heads and active-matrix liquid-crystal displays).

What is claimed is:

1. A method for providing on-site an ultra-high-purity nitric acid to a point of use, comprising:
    (a) providing a source of nitric acid at a concentration greater than 68 wt %;
    (b) introducing the nitric acid into a reflux distillation column, and withdrawing a nitric acid condensate flow from the column;
    (c) providing a reservoir for receiving the flow of nitric acid condensate; and
    (d) delivering the nitric acid from the reservoir to a point of use.

2. The method according to claim 1, further comprising preparing the source nitric acid by mixing nitric acid and high purity water in a mixing container.

3. The method according to claim 1, further comprising introducing the condensate flow into a stripper, thereby releasing low boiling impurities in the condensate flow.

4. The method according to claim 3, further comprising maintaining a temperature of the nitric acid condensate in the stripper of 80° C. or less.

5. The method according to claim 1, wherein the nitric acid is introduced into the column through the reboiler.

6. The method according to claim 1, wherein the source of nitric acid is formed by mixing together two nitric acid streams, wherein one stream has a nitric acid concentration of less than 68% and the other stream has a nitric acid concentration of greater than 68%.

7. The method according to claim 1, wherein the temperature of the nitric acid in the reboiler is 122° C. or less.

8. The method according to claim 1, further comprising maintaining a reflux rate of 50% or less of a total nitric acid condensate from the condenser.

9. The method according to claim 1, further comprising continuously removing a purge stream from the reboiler.

10. A method for providing on-site, in a semiconductor device fabrication facility, an ultra-high-purity nitric acid to a semiconductor manufacturing operation, comprising:
    (a) providing a source of nitric acid at a concentration greater than 68 wt %;
    (b) introducing the nitric acid into a reflux distillation column, and withdrawing a nitric acid condensate flow from the column;
    (c) providing a reservoir for receiving the flow of nitric acid condensate; and
    (d) delivering the nitric acid from the reservoir to a point of use in the semiconductor device fabrication facility.

11. The method according to claim 10, further comprising preparing the source nitric acid by mixing nitric acid and high purity water in a mixing container.

12. The method according to claim 10, further comprising introducing the condensate flow into a stripper, thereby releasing low boiling impurities in the condensate flow.

13. The method according to claim 12, further comprising maintaining a temperature of the nitric acid condensate in the stripper of 800C or less.

14. The method according to claim 11, wherein the nitric acid is introduced into the column through the reboiler.

15. The method according to claim 10, wherein the reboiler is at least partially made of stainless steel.

16. The method according to claim 10, wherein the temperature of the nitric acid in the reboiler is 122° C. or less.

17. The method according to claim 10, further comprising maintaining a reflux rate of 50% or less of a total nitric acid condensate from the condenser.

18. The method according to claim 10, further comprising continuously removing a purge stream from the reboiler.

19. An on-site system for providing ultra-high-purity nitric acid to a point of use, comprising:
    (a) a source of nitric acid at a concentration greater than 68 wt %;
    (b) a reflux distillation column comprising an inlet in communication with the nitric acid source for introducing nitric acid into the column, a reboiler, and a condensate outlet to provide a flow of nitric acid condensate from the column;
    (c) a reservoir in communication with the condensate outlet for receiving the flow of nitric acid condensate; and
    (d) piping for delivering nitric acid from the reservoir to a point of use.

20. The on-site system according to claim 19, further comprising a mixing container for preparing the source nitric acid.

21. The on-site system according to claim 19, further comprising a stripper in communication with the condenser outlet for releasing low boiling impurities in the condensate flow.

22. The on-site system according to claim 19, wherein the inlet in communication with the nitric acid source is connected to the reboiler.

23. The on-site system according to claim 19, wherein the reboiler is at least partially made of stainless steel.

24. The on-site system according to claim 19, wherein the distillation column contains a packing material selected from the group consisting of Raschig rings, Lessing rings, Berl saddles, spiral partition rings and grid packing.

25. The on-site system according to claim 19, further comprising a purge line connected to the reboiler.

26. An on-site subsystem, in a semiconductor device fabrication facility, for providing ultra-high-purity nitric acid to a semiconductor manufacturing operation, comprising:
    (a) a source of nitric acid at a concentration greater than 68 wt %;
    (b) a reflux distillation column having an inlet in communication with the nitric acid source for introducing nitric acid into the column, and a condensate outlet to provide a flow of nitric acid condensate from the column;
    (c) a reservoir in communication with the condensate outlet for receiving the flow of nitric acid condensate; and
    (d) piping for delivering nitric acid from the reservoir to a point of use in the semiconductor device fabrication facility.

27. The on-site subsystem according to claim 26; further comprising a mixing container for preparing the source nitric acid.

28. The on-site subsystem according to claim 26, further comprising a stripper in communication with the condenser outlet for releasing low boiling impurities in the condensate flow.

29. The on-site subsystem according to claim 26, wherein the inlet in communication with the nitric acid source is connected to the reboiler.

30. The on-site subsystem according to claim 29, wherein the reboiler is at least partially made of stainless steel.

31. The on-site system according to claim 26, wherein the distillation column contains a packing material selected from the group consisting of Raschig rings, Lessing rings, Berl saddles, spiral partition rings and grid packing.

32. The on-site system according to claim 26, further comprising a purge line connected to the reboiler.

* * * * *